United States Patent [19]

Easterling et al.

[11] Patent Number: 5,428,667
[45] Date of Patent: Jun. 27, 1995

[54] MULTI-CHANNEL CELLULAR COMMUNICATIONS INTERCEPT SYSTEM

[75] Inventors: Scott D. Easterling; Michael O. Linden; John C. Voelkel, all of Palm Bay, Fla.

[73] Assignee: Harris Corporation, Melbourne, Fla.

[21] Appl. No.: 29,751

[22] Filed: Mar. 11, 1993

[51] Int. Cl.⁶ .............................. H04Q 7/34
[52] U.S. Cl. ........................ 379/59; 379/34; 455/33.1
[58] Field of Search ............ 379/33, 34, 59, 63, 379/67, 85; 455/33.1, 67.1, 67.2, 95, 99, 100

[56] References Cited

U.S. PATENT DOCUMENTS

| | | | |
|---|---|---|---|
| 3,906,166 | 9/1975 | Cooper et al. | 379/59 |
| 5,023,900 | 6/1991 | Tayloe et al. | 379/59 |
| 5,031,204 | 7/1991 | McKernan | 379/59 |
| 5,289,526 | 2/1994 | Chymck et al. | 379/63 |

Primary Examiner—Curtis Kuntz
Assistant Examiner—Dwayne D. Bost
Attorney, Agent, or Firm—John L. DeAngelis, Jr.

[57] ABSTRACT

A multi-channel cellular communications intercept system for monitoring and then intercepting communications between a mobile unit and a base station in one cell of a cellular telephone system. The system includes a controller and a plurality of receivers with each receiver monitoring the forward control channel from a different cell within a geographical area of interest. When a global page for a target mobile unit is received, one of the receivers in the system is retuned to the forward voice communication channel on which the target mobile unit will be broadcasting for the purpose of monitoring and/or recording the conversation. The remaining receivers are retuned to the strongest forward control channels in the area.

10 Claims, 7 Drawing Sheets

MULTI-CHANNEL CELLULAR COMMUNICATIONS INTERCEPT SYSTEM

FIELD OF THE INVENTION

This invention relates to a cellular communications intercept system including a plurality of receivers under control of a system controller for intercepting, monitoring and/or recording cellular telephone conversations.

BACKGROUND OF THE INVENTION

Recent advances in communications technology have created a burgeoning telephony market, both in terms of the availability of new services and new forms of equipment. Cellular telephone technology is one of those new services now being routinely offered in many locations across the country. While cellular telephony is a powerful and efficient new medium, it has also become an important tool for carrying out illegal activities. The mobility and perceived privacy of cellular mobile communications holds significant appeal to those engaged in illegal activities. In fact, in many areas drug dealers routinely use cellular telephony to conduct their day-to-day illegal drug deals.

A prior art cellular system 10 is illustrated in FIG. 1. The cellular system 10 consists of a frequency-modulation (FM) radio network covering a series of geographical areas referred to as cells and identified by reference character 12 in FIG. 1. The two-way radios in each mobile unit, commonly referred to as cellular telephones, operate within the cells 12 by communicating between the mobile unit 14 and a base station 16 within each cell 12. The cellular system 10 is defined by a plurality of base stations 16 distributed over a geographical area of system coverage and managed and controlled over links 17 by a centralized switch referred to as the mobile telephone switching office 18 (MTSO). The base station 16 within each cell 12 has the responsibility for controlling and communicating with all mobile units 14 within the cell and for relaying voice traffic between the mobile units 14 and the mobile telephone switching office 18. The MTSO 18 then relays the voice traffic to the public service telephone network 20 (PSTN) over a link 19.

There are four frequencies used between each base station 16 and any mobile unit 14. Two forward frequencies are used for communication from the base station 16 to the mobile unit 14 and two reverse frequencies are for communications from the mobile unit 14 to the base station 16. One forward frequency is paired with one reverse frequency for communicating control and status information between any mobile unit 14 and the base station 16. A second forward frequency is paired with a second reverse frequency for communicating voice and data between the base station 16 and the mobile unit 14. By convention, these various frequencies are referred to as the forward control channel, the forward voice channel, the reverse control channel, and the reverse voice channel, respectively. Each cell 12 has a single forward control channel and a single reverse control channel for all control and status messages between mobile units 14 within the cell and the base station 16 of the cell. Each cell 12 has a number of forward and reverse voice channels for assignment by the base station 16 as required to meet the communications traffic demands. The forward voice channel is for communicating voice and data from the base station 16 to the mobile unit 14, while the reverse voice channel is the frequency on which voice/data is passed from the mobile unit 14 to the base station 16.

The following is an example of the technique for setting up an external call in the cellular system 10. When the user of the mobile unit 14 first turns on his cellular telephone, the unit scans all forward control channels to determine the strongest one. Recall that each cell 12 has a base station 16 and each base station has a unique forward control channel. The mobile unit 14 then locks onto the strongest received forward control channel, presumably the forward control channel for the cell 12 in which the mobile unit 14 is located, and continues to monitor it.

When a call is placed to a mobile unit 14 from the conventional telephone network, a global page message (or MTSO page), which includes the telephone number or electronic serial number of the called mobile unit, is generated at the mobile telephone switching office 18. The global page is then transmitted in digital format to the base station 16 of every cell 12 that is within the mobile telephone switching office 18. This multiple transmission occurs because the mobile telephone switching office 18 does not know where the target mobile unit 14 is, or if it is within the range of the mobile telephone switching office 18. Each base station 16 then transmits the global page on its unique forward control channel. When the activated mobile unit 14 identifies its own telephone number within the global page, it responds to the base station 16 on the reverse control channel, basically saying, "Here I am". The called mobile unit 14 responds on the dedicated reverse control channel that is unique to the cell 12 in which it is located, and therefore none of the other base stations 16 will see a response to the global page. The base station 16 that is tuned to that reverse control channel sees the response and selects a forward voice channel/reverse voice channel assignment for the mobile unit 14. A command (referred to as a base station page) is then transmitted to the mobile unit 14 from the base station 16 in the form of a voice channel assignment, "I hear you, and please tune to channel x to execute your call". Upon receiving this message, the mobile unit 14 tunes its receiver to the designated forward voice channel to hear the called party and tunes to the paired reverse voice channel to transmit.

This technique for call set up is further complicated as the mobile unit 14 passes from one cell to another during the conversation. The controlling base station 16 continually monitors the strength of the signal from the mobile unit 14 and if that strength diminishes significantly (perhaps indicating that the mobile unit 14 has entered a different cell) then a cell hand-off occurs. To accomplish this, a data message is transmitted from the base station 16 on the forward voice channel telling the mobile unit 14 to tune to a different voice frequency, one that is controlled by a neighboring cell. The mobile unit 14 retunes and the conversation continues on the new frequency. Many cell hand-offs may occur during a single conversation as the mobile unit 14 exits and enters cells.

When the call is completed, the mobile unit 14 scans and locks onto the strongest forward control channel, which again indicates the cell 12 in which the mobile unit 14 resides and listens for a global page that contains its telephone number or electronic serial number.

As discussed above, the mobile unit 14 receives on the forward voice channel and transmits on a different frequency, the reverse voice channel. This would imply that one would have to monitor both frequencies to hear both sides of the conversation. Such is not the case, however. Because it is unnatural for the telephone user to speak into the telephone and not hear himself in the earpiece. The telephone company transmits the user's voice back for reproduction by the earpiece. This technique is used in the cellular telephony system so that both sides of a conversation can be heard by monitoring only the forward voice channel.

While legal wiretaps can be performed on cellular telephones, where the tap itself is located at the mobile telephone switching office, this type of wiretap is not a complete solution to the problem of monitoring these conversations. If the target mobile telephone is used outside the coverage area of the tapped MTSO coverage is lost. This problem is especially troublesome in areas that are located on the boundaries between adjacent MTSO's. It is obvious that a "fixed site" wiretap on a mobile telephone system cannot be very effective. Therefore, an approach using the mobile communications medium, namely radio frequency reception, has significant advantages. The present invention, as will be described further herein, uses such a radio frequency approach.

One prior technique for monitoring cellular telephone conversations is simply to tune a single scanner or receiver to a forward voice channel and listen to the cellular conversation on that frequency (See FIG. 2). Clearly, this is a hit and miss technique as it requires continuous scanning of the forward voice channels to find a specific target mobile unit. This simple approach provides no way of: (a) following the call during a hand-off; (b) knowing who is talking unless names are spoken; (c) knowing what phone number is being used, other than the fact that it is a cellular telephone; and (d) linking target telephone numbers with cellular conversations (i.e., finding the telephone conversations of the target mobile unit when you know the target's telephone number or electronic serial number). The tape recorder 30 must be controlled manually and the receiver 32 must be manually tuned. These limitations prevent effective use of this technique for legal wiretaps by law enforcement agencies.

A second prior art scheme (FIG. 3) provides the additional feature of following the cellular telephone conversation as it shifts from one voice channel frequency to another, as the target mobile unit passes from one cell to another. This embodiment increases the complexity of the listening device by the addition of the ability to receive and decode the digital data bursts that identify the new voice channel assignment occurring on the existing voice channel frequency. These digital data bursts tell the receiver which frequency to tune to next. The two additional functions required to accomplish this task are identified as the signal processing function 34 and the processing function 36 in FIG. 3. The signal processing function 34 converts the frequency shift keyed (FSK) tone bursts (analog) into digital data by performing a simple FSK demodulation. The digital data representing the new voice channel frequency is communicated to the processing function 36. Here it is decoded and the processing function 36 then commands the receiver 32 to tune to the new frequency. In this embodiment the processing function 36 is manually tuned to establish the initial voice channel frequency to which the receiver 32 is to be tuned. The disadvantage with this embodiment is the inability to find a mobile unit having a particular telephone number or electronic serial number. Also this technique does not provide the telephone numbers (called or calling) associated with any call that is being monitored. Another limitation of this technique is its ability to only monitor a single forward control channel.

The choice of which single forward control channel to monitor is critical to the probability of intercepting a particular target due to the unique control channel allocation scheme that is based on geographical location. Recall that each cell in a cellular telephone system operates at only one forward control channel frequency. If the mobile target is not located within the coverage area of the cell using the monitored forward control channel, then the voice channel assignment to that target unit will not be available to the intercept system. Therefore, the user of such an intercept system needs prior knowledge of the cell in which the target mobile unit is operating. In those few situations where the correct forward control channel is the one monitored and the voice channel assignment is therefore received, then the intercept unit retunes its receiver to the commanded forward voice channel. The intercepter can now monitor the data on the forward voice channel and is prepared for a cell hand-off when it occurs, as described above.

In yet another embodiment (See FIG. 4) more processing power is included in the processing function 36, providing the ability to store a telephone number that the user is looking for. In this embodiment additional receiver control is added so that the receiver can first be tuned to the forward control channel for receiving telephone numbers and electronic serial numbers. Once the target number is located, the receiver locks onto that target mobile unit, starts the tape recorder, and follows the telephone conversation, including cell hand-offs. This embodiment requires the entering of the target telephone number and then tuning the receiver 32 to the desired forward control channel. This target telephone number information is input to the processing function 36. The processing function 36 also activates the tape recorder 30 when there is a match between the target telephone number and the telephone number picked up by the receiver 32.

If the target mobile unit was stationary or at least began its cellular communication in the same cell site every time, the FIG. 4 embodiment would be satisfactory. However, the nature of cellular communications is mobility. The user therefore does not know where a cellular conversation will originate. The best that can be hoped for is the general vicinity of where that conversation will begin. To solve this problem one could simply add many receivers, each having the functions previously discussed in conjunction with FIG. 4. Such a system would include the number of receivers necessary to cover the area that the target mobile unit might be in, with each receiver tuned to a different cellular control channel within that area.

With this extension of the FIG. 4 embodiment the system now has the capability to intercept cellular telephone calls for a fixed number of cell sites over a geographical area. The limitations of this system include: (a) each receiver must be manually tuned to a designated forward control channel and there must be some scheme for determining the forward control channel of choice; (b) if the target mobile unit has moved out of the geographical area, none of the conversations will be captured; (c) in this scheme the voice channel communications associated with a particular target are handled by only that receiver that was monitoring the forward control channel containing the voice channel assignment for the target mobile unit, and (d) since there is one tape recorder for every receiver, the tape recorder can only record those conversations that the receiver with which it is associated is monitoring. As a result of this last stated disadvantage, if the cellular intercept user is trying to gather evidence on a particular person or group of people, that evidence would be spread over several or all the tape recorders. For evidentiary purposes, law enforcement officials must have all conversations related to a particular person or case originally recorded on the same machine. For example, a first call of a target mobile unit is monitored by receiver A, the receiver that was monitoring the forward control channel when the target's call was established. Sometime after terminating that call, the target makes or receives another call, but this time, because the target has moved, receiver B is monitoring the forward control channel for the target's new location and therefore receiver B monitors the call. Since receivers A and B have separate recorders, these two intercepted calls are recorded on different recorders.

Another prior art system, shown in FIG. 5, allows simultaneous monitoring of multiple targets by a single system, having a plurality of receivers and a baseband switching matrix. The receivers are designated with reference numerals 41A, 41B, 41C, 41D, 41E, and 41F in FIG. 5. A switching matrix 42 provides a path to route the audio signal from each receiver over independent audio signal lines 43 to a separate dedicated monitoring station, identified with reference characters 44A, 44B, and 44C. Control signals from a computer 45 via a controller 46 are input to the switching matrix 42. Control signals are also sent to each receiver from a controller 46 over control lines 47. The computer 45 controls the switching matrix 42 and the receivers 41A through 41F. The capabilities of this system are limited by the current configuration for the computer 45, which usually include no more than six serial ports, with a single port required to control each receiver. Thus only six such receivers can be controlled by the computer 45. Also, the receivers 41A through 41F and the computer 45 must be collocated to reduce signal deterioration due to line length over the control lines 47.

In this FIG. 5 prior art system the audio signal from any receiver can be routed via the switching matrix 42 to any one of separate dedicated monitoring stations 44A through 44C. In practice, the switching matrix 42 is controlled so that the audio from the receiver that identifies the target mobile unit is recorded on a designated monitoring station and then all subsequent conversations that are also related to that target are also recorded on the same monitoring station. In this way the intercept system provides a single tape on which is located all conversations that are relevant to a specific case, where a case is all the telephone conversations relevant to a single wiretap authorization. The disadvantage, however, is that hardware limitations associated with the switching matrix 42 limit the number of recording apparatuses to approximately three. If the system is tracking more than three targets or cases, there will be multiple case recordings on at least one of the recorders. In practical implementation, the switching matrix 42 and its control are highly complex as any of the receivers 41A through 41F may at anytime be switched to any of the monitoring stations 44A through 44C. The complexity of this prior art system grows exponentially more cumbersome with the addition of each receiver and monitoring station.

SUMMARY OF THE INVENTION

The present invention overcomes the limitations discussed above by dynamic reallocation of receiver resources, by interconnection of the receivers with a network, and by including a processing function in each receiver. The system offers judicious use of data exchange between the system controller and each receiver over a high bandwidth local area network and a scheme for dynamically reallocating the receiver resources. With sufficient network bandwidth and controller processor horsepower, the intercept system of the present invention can be expanded to twenty or more channels, as many or few as are needed to cover the entire city or just a part of it. In addition, each of these channels can be a monitoring station for a unique target so that twenty or more targets can be separately monitored and recorded. This expansion also does not require any architecture modifications or hardware reconfiguration, it simply requires adding more receivers to the pool with the necessary software to control them. By putting processing capabilities in each receiver, the load on the system controller is reduced, thus allowing the use of a simpler and less costly controller.

The inventive solution to the disadvantages identified in the prior art systems above involves adding to the plurality of receivers a common point of data entry that has intelligence to know which receiver is tuned to which frequency, which tape recorder is handling which cellular telephone numbers, the ability to query a device in the system to learn what forward control frequencies are available to listen to, and to act as a central collection point for all data coming in from the receivers regarding voice assignments. With this single-point control capability the user can route cellular conversations pertaining to a particular person or group to a specific tape recorder by retuning a specific receiver to the voice channel of the target mobile unit so that conversation can be recorded on the tape recorder identified with that target. Further, this system can follow the target mobile unit through different cell areas by querying the device for active forward control channels on a regular basis and retuning receivers to one of those new control channels as required.

In addition to the single point of data entry and control, a cellular intercept system of the current invention incorporates a network architecture. By using this method of connecting the receivers several advantages are gained. The number of receivers to be connected is unlimited. If the user is targeting a small cell area only a few receivers are needed, but if the targeting area is large, like a large city, the user can connect as many receivers as there are cell sites. The network architecture, with its predefined standards and protocols, allows the receivers to be remotely located from the controller, which is a necessity for covering large areas due to the reuse of certain frequencies within the cellular system as the area of interest grows. The use of a token passing network also allows the receivers to initiate communications with the controller. This is an important distinction from simple wire connections or a bus architecture where the controller must query each receiver to get data from that receiver. A bus architecture also has the disadvantage of limiting the number of receivers and the distance those receivers can be located away from the controller.

In the present invention the system controller communicates with the plurality of receivers, where several (or all) of the receivers are also connected to monitoring apparatuses, for example a recorder. Each receiver monitors a different cell, or more specifically, the base station page from a different cell in the geographical area of interest, and decodes the telephone number or electronic serial number in the page. The decoded information is input to the controller and when a page identifies a target mobile unit (by telephone number or electronic serial number), the system controller recognizes this and commands one of the receivers to retune to the forward voice channel that was just assigned to the target mobile unit in the page. The retuned receiver is that receiver which is physically connected to the monitoring (e.g. recording) station dedicated to that particular target, i.e., the monitoring station for all communications related to a particular case. Once retuned, the receiver is removed from the pool of receivers monitoring forward control channels. The retuned receiver monitors the forward voice channel of the target mobile unit and follows cell hand-offs as they occur. The system controller may then retune one of the other receivers in the pool to cover monitoring of the forward control channel that the recently retuned receiver had been monitoring. This retuning would be based on a pre-programmed priority scheme. For instance, the highest priority target monitoring station may be physically connected to the receiver that is assigned to monitor the lowest priority cell's forward control channel.

BRIEF DESCRIPTION OF THE DRAWINGS

The present invention can be more easily understood and the further advantages and uses thereof more readily apparent, when considered in view of the description of the preferred embodiments and the following figures in which.

DESCRIPTION OF THE PREFERRED EMBODIMENTS

As discussed above, in a cellular telephony system many discrete, limited coverage base transceivers (base stations 16 in FIG. 6) are networked into a system that provides widespread coverage over a geographical area. The connection between the mobile unit 14 and the base station 16 is established by a global page from each base station 16, on its unique forward control channel, in the MTSO network. This global page identifies the called mobile unit 14 by either a telephone number or the electronic serial number. Upon receipt of the global page, the called mobile unit 14 responds, on the reverse control channel, to the base station 16 of the cell in which it is located to identify its presence in the cell. The receiving base station 16 then responds on the forward control channel with a base station page that identifies the voice channel assignment for the called mobile unit. The base station 16 in that cell then handles the traffic on the forward and reverse voice channels.

Intercepting telephone conversations of a particular target mobile unit can be accomplished by first intercepting the voice channel assignment. Since this channel assignment is available only by intercepting the base station page to the mobile unit 14, the cellular intercept system needs to know the location of the mobile unit 14 and thus the proper cell 12 to monitor. Alternatively, the intercept system must monitor multiple cells to cover a large geographical area, which increases the likelihood of intercepting the appropriate base station page. To monitor several cells in a geographical area requires multiple receivers, where each is capable of identifying the control data associated with a target mobile unit and the voice channel assignment for that target mobile unit. This feature is one of the key aspects of the present invention.

Figure 1:
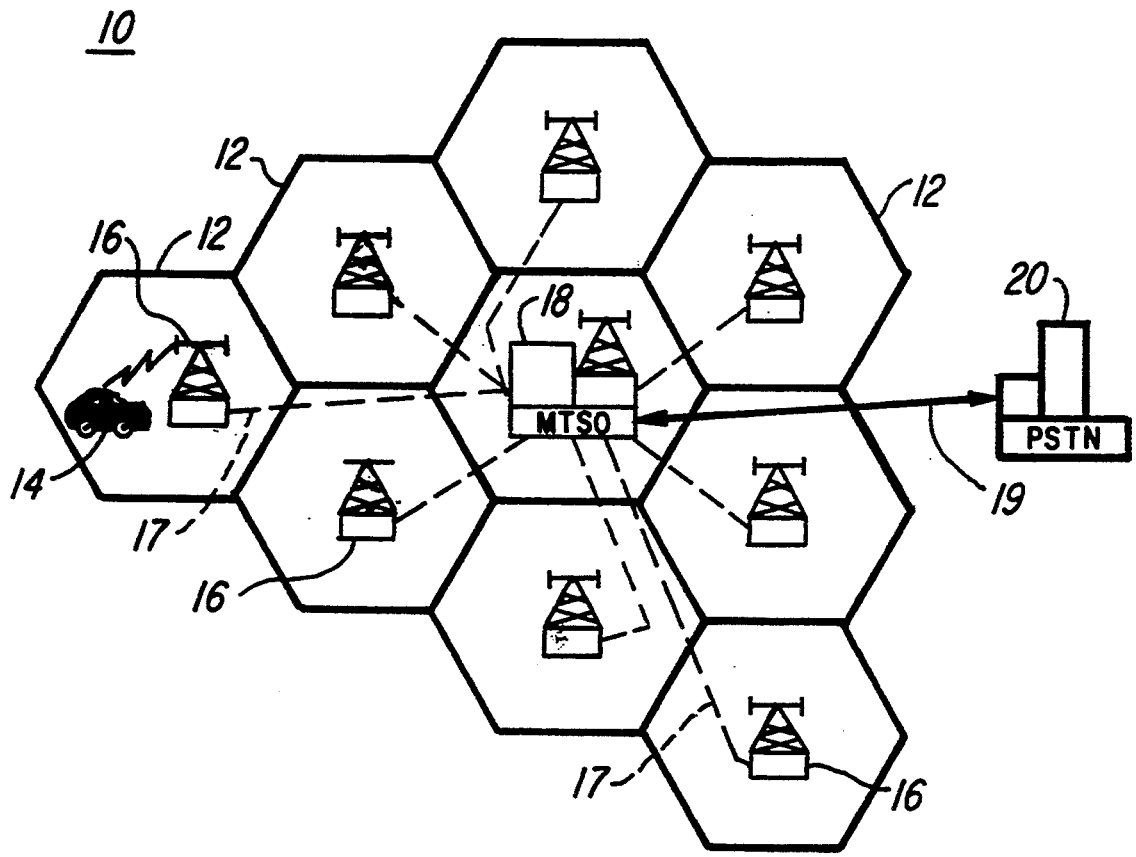
FIG. 1 is a diagrammatical presentation of a cellular telephone system.
Figure 2:
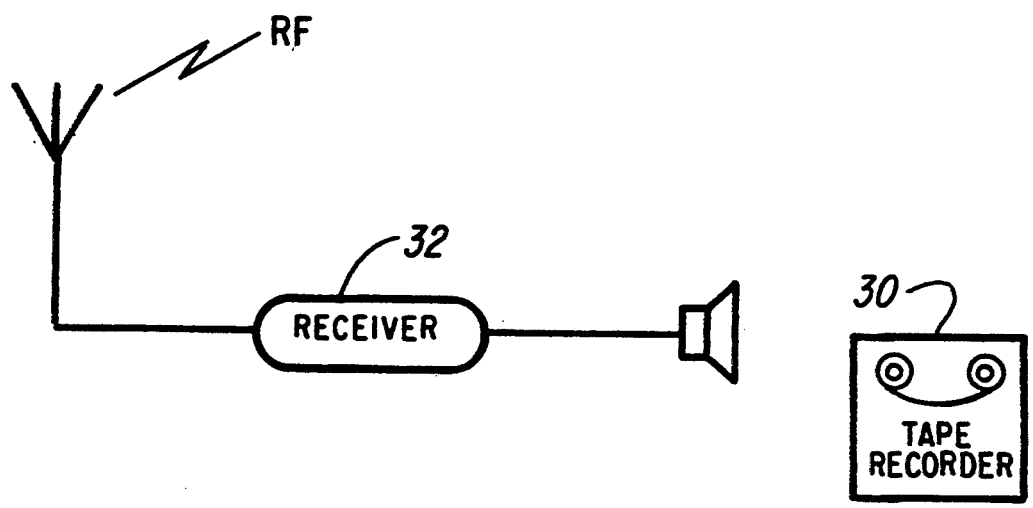
FIGS. 2–5 are block diagrams of prior art cellular intercept systems.
Figure 3:
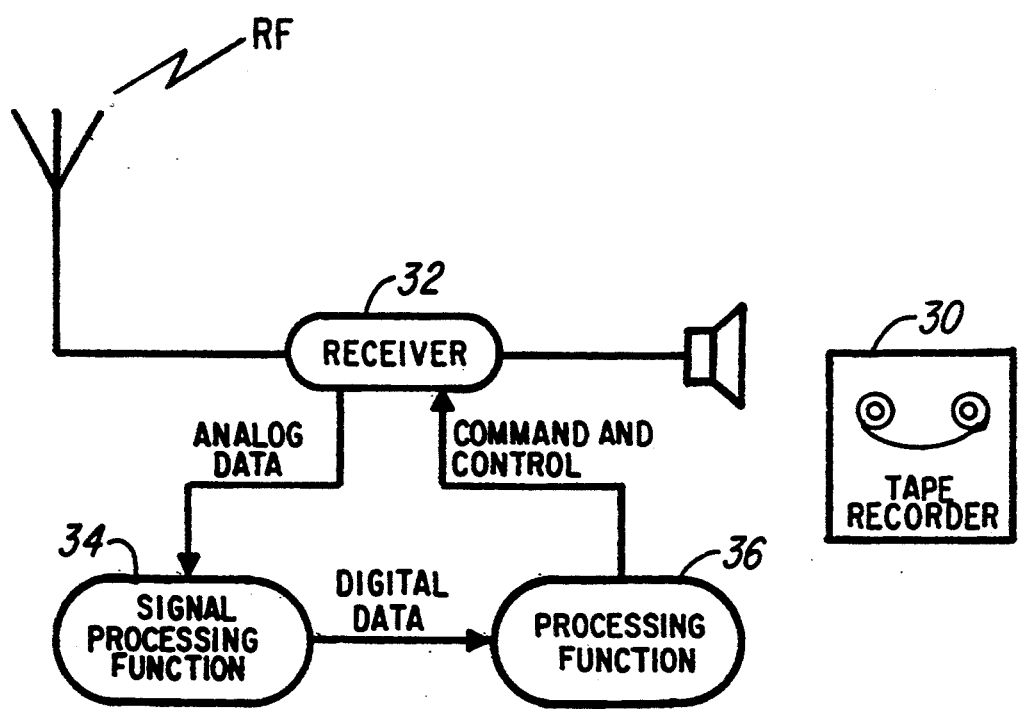
Figure 4:
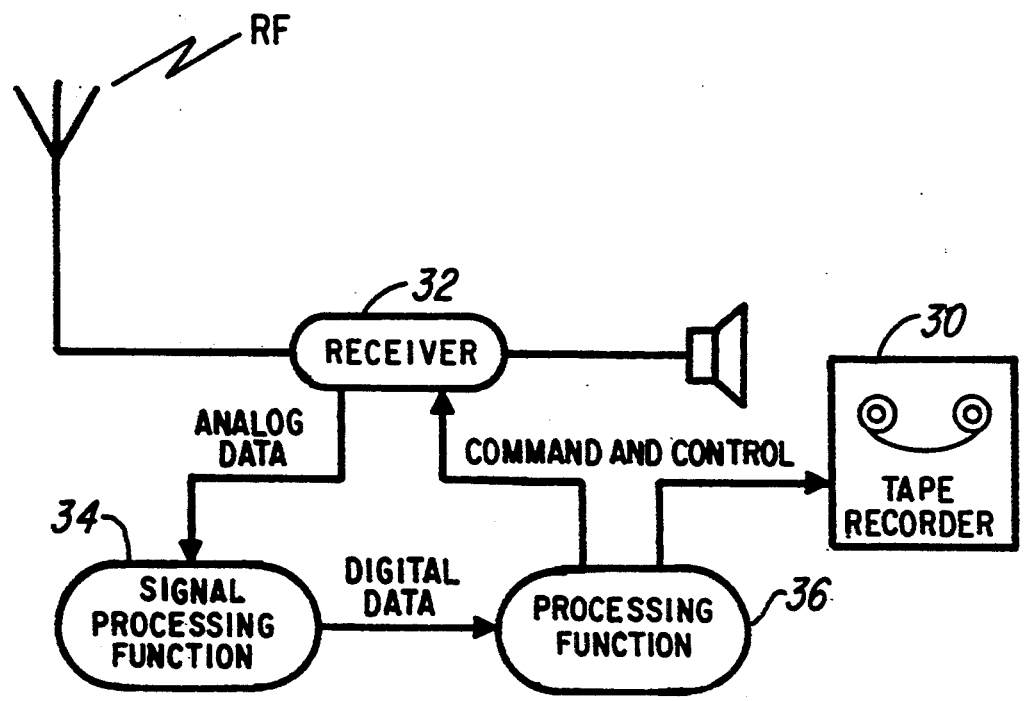
Figure 5:
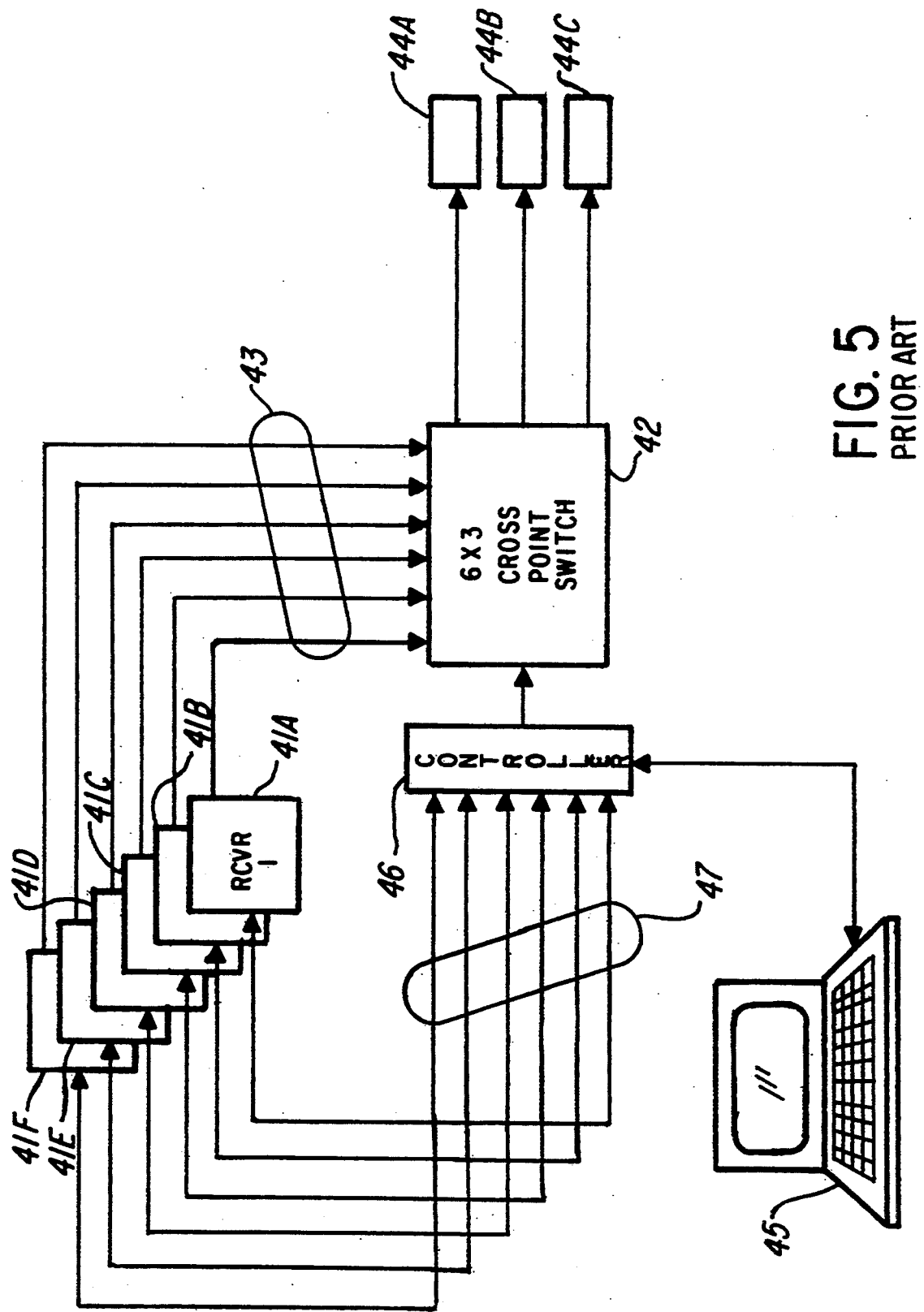
Figure 6:
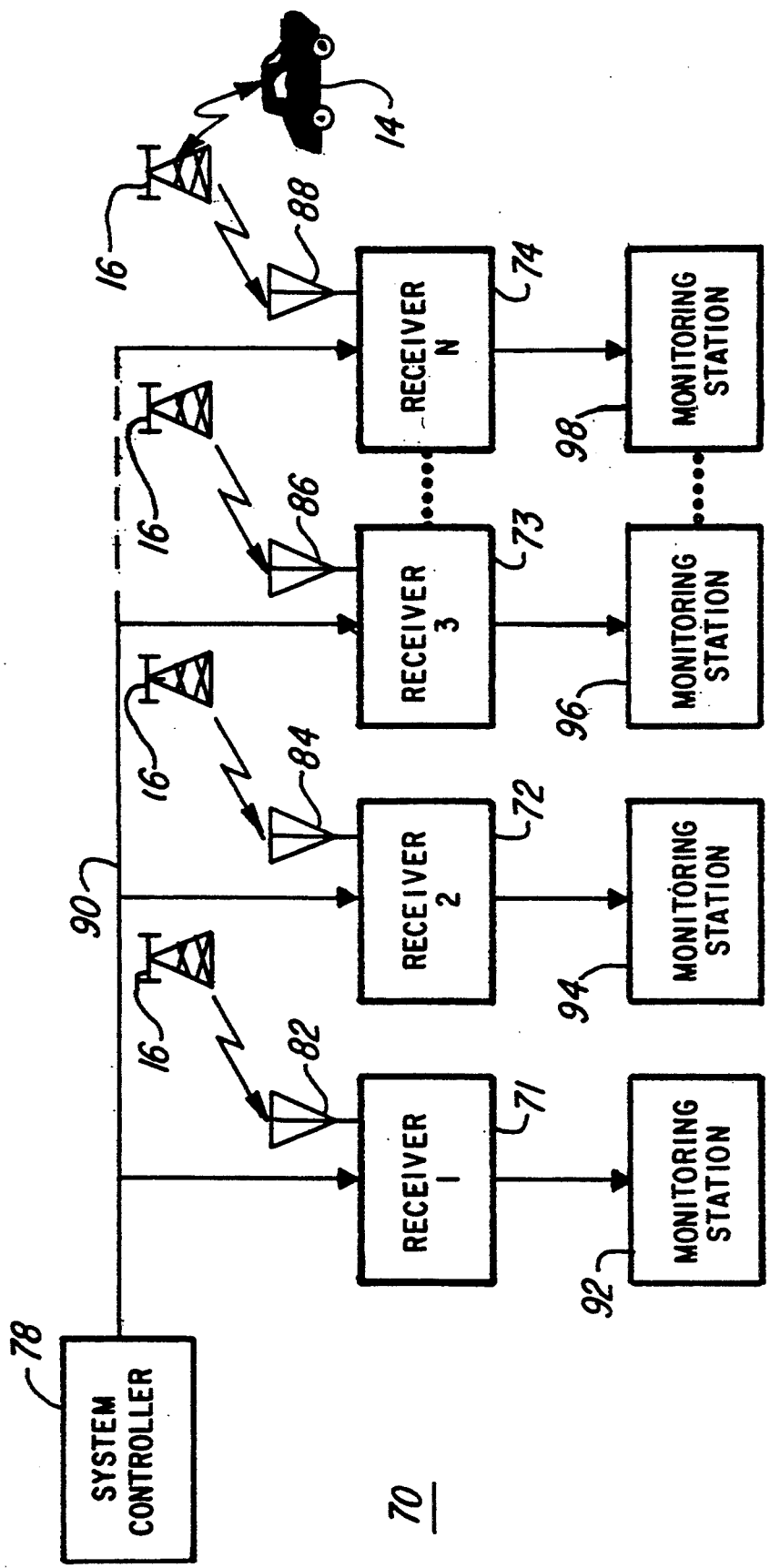
FIG. 6 is a block diagram of a cellular intercept system constructed according to the teachings of the present invention.

FIG. 6 is a block diagram of a cellular intercept system 70 including receivers 71, 72, 73 and 74 under the control of a system controller 78. While FIG. 6 shows four receivers, it is to be understood by those skilled in the art that the cellular intercept system 70 can be increased in size and coverage area to include any number of receivers, as many as twenty or more given the current processing power associated with the system controller 78. Each receiver 71, 72, 73 and 74 is connected to an antenna 82, 84, 86 and 88, respectively, for receiving communications from one of the base stations 16 and from mobile units 14. The system controller 78 communicates with each receiver 71 through 74 via an interconnect 90. In the preferred embodiment this interconnect is a token-passing local area network having a bandwidth greater than approximately 200 kb/s, e.g., Ethernet or Appletalk. Access is gained to the network by the well-known token-passing scheme. Each receiver is also connected to a monitoring station, shown in block diagram form in FIG. 6 and identified by reference characters 92, 94, 96 and 98. A monitoring station may include a listening device, e.g., headphones, and/or a recording apparatus. Each monitoring station may also be preassigned to a specific target or case. For example, the monitoring station 92 may be designated to monitor and/or record conversations associated with target A, independent of which receiver 71 through 74 receives the base station page intended for target A. To accomplish this, the system controller 78 controls the receiver 71 to always assign that receiver and its associated monitoring station 92 to all telephone conversations involving target A.

Figure 7:
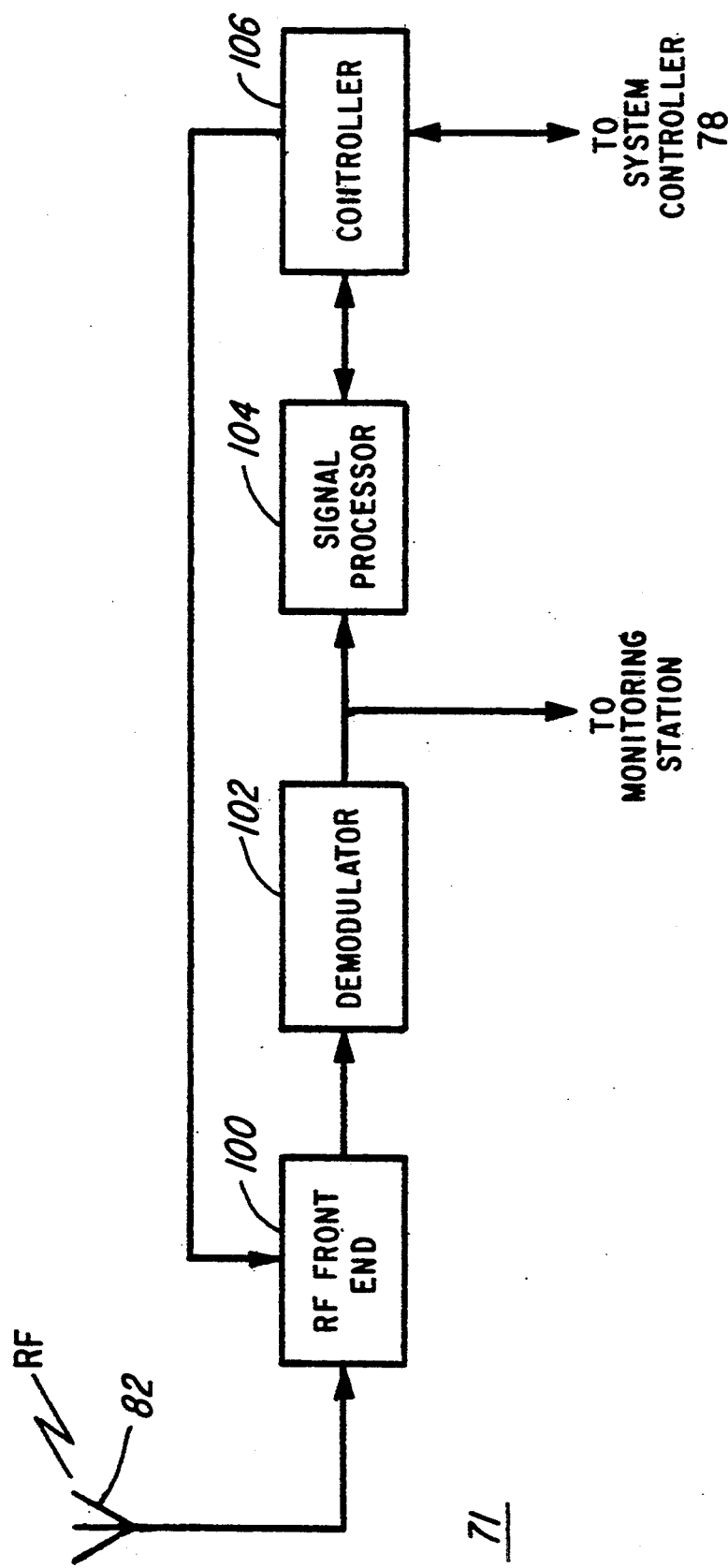
FIGS. 7, 8, and 9 are diagrams of details of the cellular intercept system of FIG. 6.

FIG. 7 shows a block diagram of the receiver 71. This block diagram is typical for all receivers in the cellular intercept system 70. Radio frequency signals collected by the antenna 82 are serially processed by an RF front-end 100 and a demodulator 102. The RF front-end 100 and the demodulator 102 incorporate the well-known classical circuitry for performing these functions. The demodulator 102 is capable of demodulating narrow-band frequency modulated signals used in the cellular system. The baseband signal from the demodulator 102 is input to the monitoring station 92 for monitoring and/or recording, as shown in FIG. 7. Immediately prior to a cell hand-off, the new voice channel assignment for the target mobile unit is transmitted over the existing voice channel in the form of audio tones. These audio tones, after passing through the RF front-end 100 and the demodulator 102, are input to a signal processor 104 for decoding. The digital representation of that new voice channel frequency is input to a controller 106. The controller 106, which is for example a microprocessor, signals the RF front-end 100 to retune to the new voice channel assignment so that monitoring of the cellular telephone conversation can continue on the new voice channel. Information regarding this change in receiving frequency is also sent to the system controller 78 over the interconnect 90. The system controller 78, which is also a microprocessor for example, checks the new voice channel assignment to be sure it is a valid voice channel frequency within the geographical area. The system controller 78 also determines whether other conversations are already being monitored on that same voice channel frequency, and if the other conversations have a higher priority, can command the receiver 71, via the controller 106, to discontinue monitoring activities on that voice frequency.

The basic intent of the communications; intercept system 70 is the use of intelligent receivers to minimize network traffic between the system controller 78 and the receivers 71–74. Further, receiver pooling devotes a quantity of n receivers to monitor the base station pages from n cells, with receivers individually removed from the pool, as needed, to monitor conversations of target mobile units. Although only four receivers are illustrated in FIG. 6, it is understood that the system can be increased to include as many as twenty (or more) receivers for increased monitoring capabilities. In setting up the communications intercept system 70, the cells to be monitored are chosen so as to form a coverage net around a target mobile unit's most likely geographic location. The global pages from each receiver 71, 72, 73 and 74 are passed to the system controller 78. Further, after the called mobile unit 14 responds to a global page, the base station 16 transmits a base station page containing the voice channel assignment for the call. This channel assignment will also be received by the receiver monitoring pages in that cell 12, demodulated, decoded, and sent to the system controller 78. Further, prior to system operation, the telephone numbers (or electronic serial numbers) of the target mobile units are entered into the system controller 78 so that a comparison can be made between the target telephone numbers and the telephone numbers received in the global pages. When a match occurs between these telephone numbers, the system controller 78 designates one of the receivers, for example receiver 71, as the intercept receiver. The receiver 71 is then commanded by the system controller 78 to retune to the forward voice channel that had been identified in the base station page. Once retuned, receiver 71 demodulates the telephone conversations of the target mobile unit (as carried on the forward voice channel). The conversation can be monitored and/or recorded at the monitoring station 92, which is dedicated to the receiver 71. In one embodiment, once a receiver is removed from the receiver monitoring pool, the remaining receivers are retuned to always monitor the strongest forward control channels.

Figure 8:
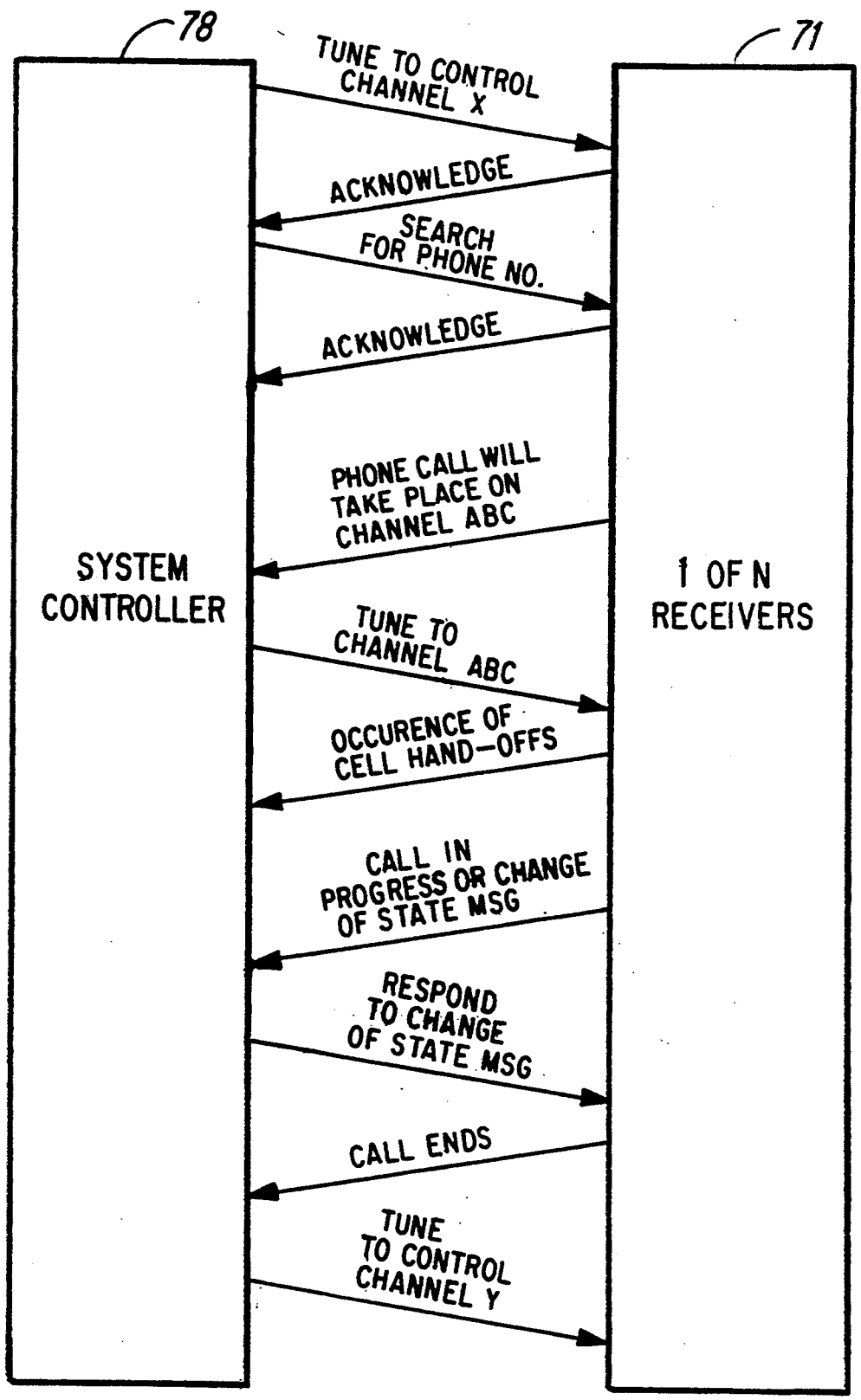

The basic aspects of the operation of the cellular intercept system 70, especially the interaction between the receivers 71 through 74 and the system controller 78, are shown diagrammatically in FIG. 8. All signal/commands from the system controller 78 shown in FIG. 8 are input to the controller 106 (See FIG. 7) of the receiver 71. The controller 106 then commands the various functions of the receiver 71 to accomplish the intended result.

The system controller 78 first commands one or more of the n receivers (in this example receiver 71) to tune to a control channel x for the purpose of receiving global pages. All the commands illustrated in FIG. 8 as passing between the system controller 78 and the receiver 71 are passed over the interconnect 90. The receiver 71 responds with an acknowledgement and then the system controller 78 identifies one or more specific telephone numbers that the receiver 71 is to be searching for. The receiver 71 parses large quantities of data in the global pages in search of the specified telephone number. Turning to FIG. 7, this is accomplished by the reception and demodulating of the RF signal in which the called telephone number is encoded. This analog information is decoded in a signal processor 104 and then sent to the controller 106. The controller 106 compares the transmitted or called telephone numbers that are received from the signal processor 104 with the contents of its memory, i.e., the list of target telephone numbers sent from the system controller 78. Note that the system controller 78 can send a different list of telephone numbers to be searched for to each receiver, in this way expanding the capabilities of the system.

When a match is found the receiver 71 acknowledges this by sending a message from the controller 106 to the system controller 78. If the target mobile unit having the specified telephone number received the global page, the same global page that receiver 71 received, the mobile unit will respond, and then the base station 16 in the affected cell 12 will transmit a base station page providing the voice channel frequency assignment. The receiver 71 will also receive the base station page and signal the system controller 78 that the "phone call will take place on channel ABC." With this information in hand, the system controller 78 commands the receiver 71, or any of the other n receivers in the pool, to tune to channel ABC for the purpose of monitoring the target's cellular telephone conversation. As described earlier, the receiver 71 also follows the cell hand-offs as they occur and informs the system controller 78 of these occurrences.

The receiver 71 also informs the system controller 78 that the monitored telephone call continues in progress and whether any state changes have occurred. Examples of such state changes include the occurrence of a cell hand-off or a change in transmitted power level of the target mobile unit. The base station 16 continually monitors the power level of each mobile unit 14 and commands that mobile unit to either increase or decrease the transmitted power level as required to maintain efficient communications. As the need arises, the system controller 78 responds to the receiver 71 with change of state message responses, confirming, for example, a cell hand-off. When a call ends, a message to this effect is sent to the system controller 78, followed by a response to the receiver 71 to tune to a control channel y for receiving global pages and starting the process over again.

Figure 9:
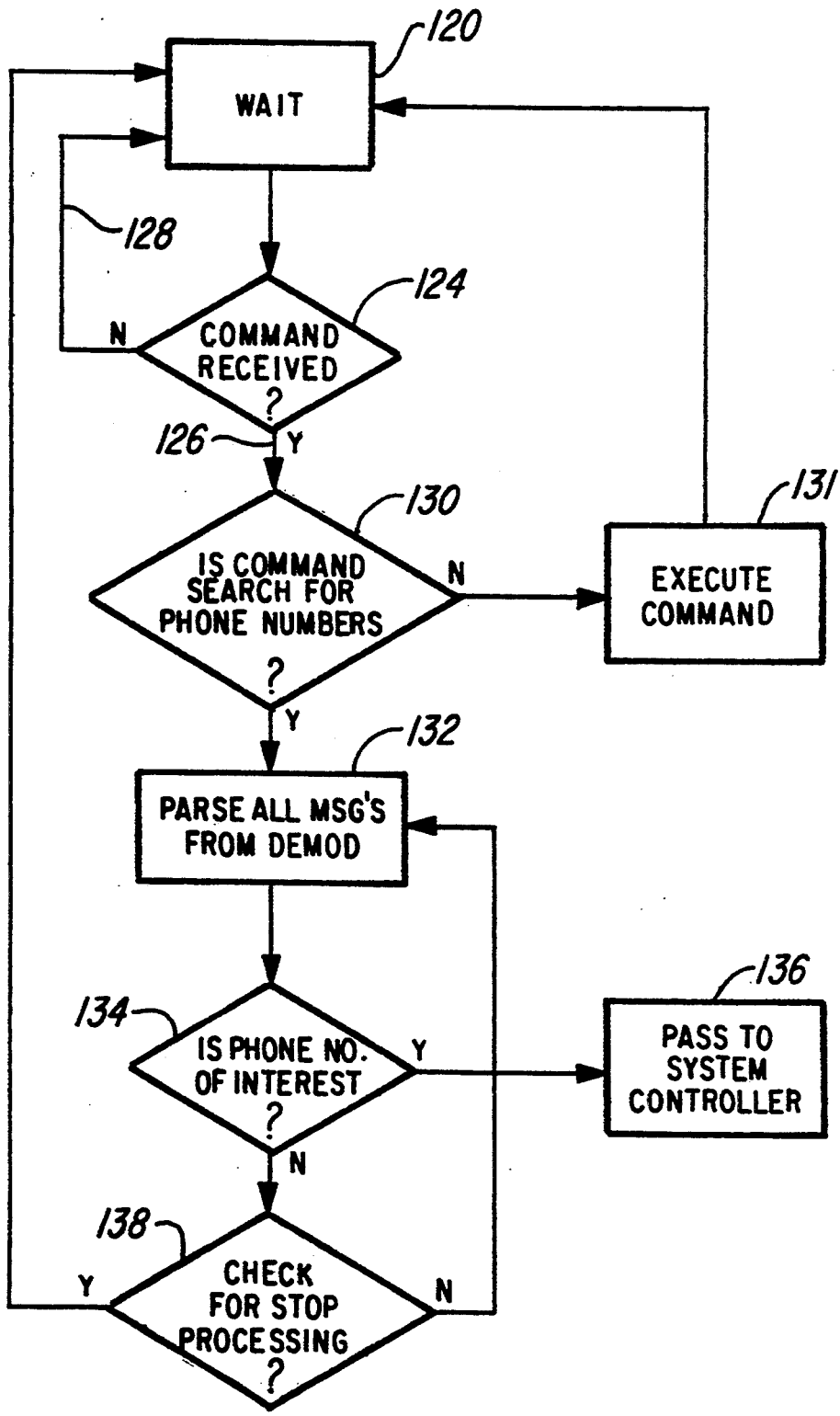

FIG. 9 is a diagrammatic representation showing operation of the controller 106, i.e., a controller within one of the receivers 71 through 74. At power up the controller 106 enters a wait state 120. If a command is received, as shown by step 124, processing continues via path 126. If no command is received the controller remains in wait state 120 via the return path 128. Following path 126, there is a step 130 where the command is filtered to determine whether it is a "search for a telephone number" command. If it is not such a command, then processing moves to step 131 where the command is processed.

If the command is a "search for telephone numbers" command processing moves to a step 132 where the controller 106 parses all the messages from the demodulator 102, decodes them, and passes them to the signal processor 104. As discussed above, the signal processor 104 accepts the analog signal from the demodulator and converts it to a digital signal representing the telephone numbers received. At step 134 query is made as to whether the received telephone number is one of interest. This function is accomplished in the controller 106, where the received telephone number is compared with target numbers received from the system controller 78 and stored in the controller 106. If a match occurs, processing moves to a step 136 where the received telephone number is passed to the system controller 78. Otherwise, processing moves to a step 138. If a stop processing command has been received by this time then processing moves back to the wait state 120. If a stop processing command has not been received, then the controller 106 continues to parse the received telephone numbers and determine whether one is a telephone number of interest at the step 134.

As mentioned above and as represented by step 131 in FIG. 9, there are other commands that the controller 106 processes. The reset or power up command is used to mute the receiver 71 at the beginning of a session, for example. At this time the RF front end 100 can be set to a predetermined frequency or the system controller 78 may issue a command identifying the initial frequency. The receiver 71 can also be commanded to listen to information on various frequencies, including the forward control channel, the forward voice channel, and the reverse control channel. With respect to the forward control channel, the receiver 71 can also be further commanded to listen only to page data or only to voice channel assignment frequencies. The system controller 78 can also issue commands to change the audio output level from the demodulator 102 or to mute that output altogether. On command from the system controller 78, the signal processor 104 can decode power level information obtained from any mobile unit 14.

As previously discussed in conjunction with FIG. 8, at this point the system controller 78 responds to the telephone numbers received and the follow up voice channel assignment by tuning one of the receivers to that voice channel for the purpose of intercepting the cellular telephone conversation.

One key feature of the present invention is the pooling of n receivers to receive both the global pages and the base station pages and the designation of one of those n receivers as the telephone traffic intercept receiver for a particular target. In fact, this designation can be made before any receiver receives page data for that target mobile unit. In any case, when one of the receivers is removed from the pool to monitor and/or record the telephone conversations of the target mobile unit, the remaining receivers continue monitoring global pages in search of telephone numbers for other target mobile units, as illustrated by the example in FIG. 8. In this way, the system operation is optimized so that the maximum number of receivers is always monitoring global pages and as each target mobile unit is found, one receiver drops out of the pool to monitor/record conversations of that target mobile unit.

In the communications intercept system 70 note that the system controller 78 can choose any receiver 71 through 74 to be the monitoring receiver for conversations from any target mobile unit, and thus in effect can have that target mobile unit conversation monitored on any one of the monitoring stations 92, 94, 96, and 98. This is especially helpful in establishing a case for the wiretap authorities in that all conversations for a particular target unit can be routed to a designated monitoring station so that all those conversations are monitored and recorded in sequence.

The system controller 78 can also command any receiver, for example receiver 71 via the controller 106, to tune to a reverse data channel in search of a called telephone number. Once such a called number is identified, the system controller 78 can command any receiver, for example the receiver 71 via the controller 106, to tune to the base page frequency for the cell in which the calling mobile unit is located. The voice channel assignment for the cellular telephone conversation will be transmitted on the base station page frequency and received by the receiver 71. The controller 106 can then retune the receiver 71 to that voice channel frequency and also advise the system controller 78 of this frequency assignment.

As can be seen, the architecture of the communications intercept system 70 easily allows for the expansion of the number of monitoring receivers. Also, if certain receivers are designated as traffic intercept receivers, the number of these can also be expanded. The only limitations on the expansion of the communications intercept system 70 are the capacity of the interconnect 90 and the processing power of the controller 78.

In another embodiment of the present invention each receiver 71 through 74 would broadcast to all other receivers on the network 90 that a telephone number match has occurred between the telephone number transmitted in the global page and the list of target telephone numbers in that receiver's memory. The receiver on the network 90 that is identified as the monitoring and/or recording receiver for that telephone number would then respond back to the initiating receiver with a message that the identified receiver will retune to the voice channel frequency for that cellular telephone conversation and record it. This would be followed by a message to the system controller 78 as to what has occurred. In this embodiment the system controller 78 is relegated to a data entry, display, and overall system configuration role because the receivers 71 through 74 are capable of controlling their own sub-systems and communicating with the other receivers in the cellular intercept system 70. Such a system of distributed control further reduces traffic carried on the interconnect 90.

While we have shown and described embodiments in accordance with the present invention, it is understood that the same is not limited thereto but is susceptible to numerous changes and modifications as known to a person skilled in the art, and we therefore do not wish to be limited to the details shown and described herein, but intend to cover all such changes and modifications as are obvious to one of ordinary skill in the art.

What is claimed is:

1. A cellular communications intercept system for intercepting cellular telephone communications on a cellular network between a base station and a target mobile unit, wherein the cellular network includes a plurality of cells with each cell having a base station, wherein all mobile units communicate with the base station on an assigned voice channel, and wherein each mobile unit has a preassigned unique identification number, and wherein a global page on a forward control channel from each base station to all mobile units in the cellular network includes the identification number of the called mobile unit, and wherein a base station page on the forward control channel of the base station for the cell in which the called mobile unit is located identifies the voice channel for the called mobile unit, said cellular communications intercept system comprising:

- a plurality of tunable receivers, wherein each receiver is tuned to the forward control channel of one base station for receiving the base station pages and the global pages transmitted on that forward control channel;
- wherein each of said plurality of receivers includes decoder means responsive to each received global page for extracting therefrom the identification number of the called mobile unit;
- wherein each of said decoder means is responsive to each base station page for extracting therefrom the voice channel assignment for the call to the mobile unit;
- storage means for storing target mobile unit identification numbers;
- comparator means responsive to the identification number of the called mobile unit and responsive to the stored target mobile unit identification numbers and for producing a match signal when the identification number of a called mobile unit matches one of the stored target mobile unit identification numbers;
- controller means for controlling said plurality of receivers and responsive to said match signal and said voice channel assignment;
- wherein one receiver of the plurality of receivers is designated as the primary receiver for at least one predetermined target mobile unit, and wherein the controller means, in response to the match signal, commands said identified receiver to tune to the assigned voice channel for said at least one predetermined target mobile unit, such that voice communications for said at least one predetermined target mobile unit are received by said identified receiver; and
- a monitoring station connected to each one of the plurality of receivers for monitoring all communications intercepted by said connected receiver.

2. The cellular communications intercept system of claim 1 wherein the remaining receivers of the plurality of receivers are retuned, as may be required, to the highest priority forward control channels in the geographic area.

3. The cellular communications intercept system of claim 1 wherein the identification number is the telephone number of the target mobile unit.

4. The cellular communications intercept system of claim 1 wherein the identification number is the electronic serial number of the target mobile unit.

5. The cellular communications intercept system of claim 1 wherein under control of the controller means each of the plurality of receivers can be tuned to a different voice channel assignment such that the communications intercept system can simultaneously monitor the communications of more than one target mobile unit.

6. The cellular communications intercept system of claim 1 wherein the system controller and the plurality of receivers are interconnected by a local area network.

7. The cellular communications intercept system of claim 6 wherein each of the plurality of receivers is located at a site remote from the controller means.

8. The cellular communications intercept system of claim 1 wherein the monitoring station includes a recording device.

9. A cellular communications intercept system for intercepting cellular telephone communications on a cellular network between a base station and a plurality of target mobile units, wherein the cellular network includes a plurality of cells with each cell having a base station, wherein each one of said plurality of target mobile units communicates with a base station on an assigned voice channel, and wherein each one of said plurality of target mobile units has a preassigned unique identification number, and wherein a global page on a forward control channel from each base station to all mobile units in the cellular network includes the identification number of the called mobile unit, and wherein a base station page on the forward control channel of the base station for the cell in which the called mobile unit is located identifies the voice channel assignment for the called mobile unit, said cellular communications intercept system comprising:

- a plurality of tunable receivers, wherein each receiver is tuned to the forward control channel of one base station in the cellular network for receiving the global page on that forward control channel;
- wherein each of said plurality of receivers includes decoder means responsive to each received global page for extracting therefrom the identification number of the called mobile unit;
- wherein the identification number of at least one of said plurality of target mobile units is stored within each of said plurality of receivers;
- wherein one receiver of said plurality of receivers is designated as the monitoring receiver for each target mobile unit;
- wherein when any one of said plurality of receivers identifies a match between the identification number of the called mobile unit and the identification number of one of said plurality of target mobile units, said identifying receiver produces a match signal that is communicated to each of the other plurality of receivers;
- wherein in response to said match signal said receiver of said plurality of receivers having been designated as the monitoring receiver for the identified target mobile unit responds thereto and retunes to the voice channel for the identified target mobile unit for the purpose of monitoring the communications associated with the identified target mobile unit.

10. A cellular communications intercept system for intercepting cellular telephone communications on a cellular network between a base station and a target mobile unit, wherein the cellular network includes a plurality of cells with each cell having a base station, wherein all mobile units communicate with the base station on an assigned voice channel, and wherein each mobile unit has a preassigned unique identification number, and wherein a call is placed by a mobile unit by transmitting the called telephone number on the reverse control channel to the base station of the cell in which the mobile unit is located, and wherein when the call is set up the base station transmits to the calling mobile unit a base station page on its forward control channel that identifies the assigned voice channel for the call, and wherein in response to the base station page, the calling mobile unit uses the assigned voice channel for the call, said cellular communications intercept system comprising:
- a plurality of tunable receivers, wherein each receiver is tuned to the reverse control channel of one base station for receiving the called telephone numbers transmitted on that reverse control channel;
- wherein each of said plurality of receivers is responsive to a base station page for extracting therefrom the voice channel assignment for the call;
- storage means for storing target telephone numbers;
- controller means for controlling said plurality of receivers;
- wherein the called telephone numbers are input to said controller means;
- wherein the voice channel assignments are input to said controller means;
- wherein one receiver of the plurality of receivers is designated as the primary receiver for at least one target mobile unit; and
- wherein when the called telephone number matches a target telephone number, said controller means causes said primary receiver to tune to the voice channel assignment for the call for monitoring the telephone call.

* * * * *